(12) United States Patent
Dettinger et al.

(10) Patent No.: US 9,679,031 B2
(45) Date of Patent: Jun. 13, 2017

(54) COMPOSING ABSTRACT QUERIES FOR DELEGATED USER ROLES

(75) Inventors: Richard D. Dettinger, Rochester, MN (US); Frederick A. Kulack, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 748 days.

(21) Appl. No.: 12/210,723

(22) Filed: Sep. 15, 2008

(65) Prior Publication Data
US 2009/0006352 A1    Jan. 1, 2009

Related U.S. Application Data

(63) Continuation-in-part of application No. 11/226,181, filed on Sep. 14, 2005, now Pat. No. 8,180,787.

(51) Int. Cl.
*G06F 7/00*    (2006.01)
*G06F 17/30*    (2006.01)

(52) U.S. Cl.
CPC .............................. *G06F 17/3056* (2013.01)

(58) Field of Classification Search
CPC ................................................ G06F 17/3056
USPC ................................ 707/781–788, 810, 763
See application file for complete search history.

(56) References Cited

U.S. PATENT DOCUMENTS

| | | | |
|---|---|---|---|
| 5,253,362 A | 10/1993 | Nolan et al. | |
| 5,734,887 A | 3/1998 | Kingberg et al. | |
| 6,189,004 B1 * | 2/2001 | Rassen | G06F 17/30392 |
| 6,189,036 B1 * | 2/2001 | Kao | 709/229 |
| 6,553,368 B2 | 4/2003 | Martin et al. | |
| 6,581,054 B1 * | 6/2003 | Bogrett | G06F 17/30395 |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,096,229 B2 | 8/2006 | Dettinger et al. | |
| 2002/0026592 A1 * | 2/2002 | Gavrila et al. | 713/201 |
| 2002/0078068 A1 | 6/2002 | Krishnaprasad et al. | |
| 2003/0220893 A1 | 11/2003 | Dettinger et al. | |

(Continued)

OTHER PUBLICATIONS

Llama, "Search Code: Search Your Database," <http://www.codewalkers.com/c/a/Search-Code/Search-Your-Database/>, retrieved Mar. 23, 2009, pp. 1-4.

(Continued)

*Primary Examiner* — Van Oberly
(74) *Attorney, Agent, or Firm* — Patterson + Sheridan, LLP

(57) ABSTRACT

Embodiments of the invention provide a database administrator composing an abstract query with visibility to logical fields that are permitted for the delegated roles. In one embodiment, a query interface is configured to receive administrator selections of delegated roles (i.e., the user roles to be provided with access to the finished abstract query). The query interface may then present the administrator with logical fields that are permitted for each delegated role. Providing such information may enable the administrator to verify that all intended users will have access to the finished abstract query.

21 Claims, 10 Drawing Sheets

(56) References Cited

U.S. PATENT DOCUMENTS

2006/0010127 A1  1/2006  Dettinger et al.

OTHER PUBLICATIONS

Meng et al., "A Theory of Translation From Relational Queries to Hierarchical Queries," *IEEE Transactions on Knowledge and Data Engineering*, Apr. 1995, vol. 7(2): pp. 228-245.
Office Action History for U.S. Appl. No. 10/083,075 from Nov. 26, 2004 to Sep. 1, 2005.
Office Action History for U.S. Appl. No. 11/226,181 from Mar. 25, 2009 to Aug. 10, 2010.

* cited by examiner

COMPOSING ABSTRACT QUERIES FOR DELEGATED USER ROLES

CROSS-REFERENCE TO RELATED APPLICATIONS

This application is a continuation-in-part of co-pending U.S. patent application Ser. No. 11/226,181, filed Sep. 14, 2005 now U.S. Pat. No. 8,180,787. The aforementioned patent is herein incorporated by reference in its entirety.

BACKGROUND OF THE INVENTION

The invention generally relates to computer database systems. More particularly, the invention relates to techniques for composing abstract queries for delegated user roles.

DESCRIPTION OF THE RELATED ART

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database. Data abstraction models may be used to implement abstract rules. Abstract rules specify predicates and actions, and are composed with reference to logical fields. Abstract rules may be executed in a rule engine in order to perform an analysis routine.

SUMMARY OF THE INVENTION

One embodiment of the invention provides a computer-implemented method, comprising: receiving a selection, from a set of predefined user roles, of a plurality of user roles to be provided access to an abstract query, wherein the set of predefined user roles is defined in an abstraction model that defines logical fields that model underlying physical data in a manner making a schema of the physical data transparent to a user of the abstraction model; for each of the plurality of user roles, determining a group of permitted logical fields to which access is permitted for the user role; presenting, in a query interface, a plurality of the logical fields, at least a portion of the logical fields being designated with an indication of which group the respective logical field belongs to; receiving a selection, from the plurality of logical fields, of one or more logical fields to be included in the abstract query; and composing the abstract query using the one or more logical fields.

Another embodiment of the invention provides a computer-readable storage medium containing a program which, when executed, performs an operation. The operation may comprise: receiving a selection, from a set of predefined user roles, of a plurality of user roles to be provided access to an abstract query, wherein the set of predefined user roles is defined in an abstraction model that defines logical fields that model underlying physical data in a manner making a schema of the physical data transparent to a user of the abstraction model; for each of the plurality of user roles, determining a group of permitted logical fields to which access is permitted for the user role; presenting, in a query interface, a plurality of the logical fields, at least a portion of the logical fields being designated with an indication of which group the respective logical field belongs to; receiving a selection, from the plurality of logical fields, of one or more logical fields to be included in the abstract query; and composing the abstract query using the one or more logical fields.

Yet another embodiment of the invention provides a system, comprising: a processor; and a memory containing a program configured to perform an operation. The operation may comprise: receiving a selection, from a set of predefined user roles, of a plurality of user roles to be provided access to an abstract query, wherein the set of predefined user roles is defined in an abstraction model that defines logical fields that model underlying physical data in a manner making a schema of the physical data transparent to a user of the abstraction model; for each of the plurality of user roles, determining a group of permitted logical fields to which access is permitted for the user role; presenting, in a query interface, a plurality of the logical fields, at least a portion of the logical fields being designated with an indication of which group the respective logical field belongs to; receiving a selection, from the plurality of logical fields, of one or more logical fields to be included in the abstract query; and composing the abstract query using the one or more logical fields.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
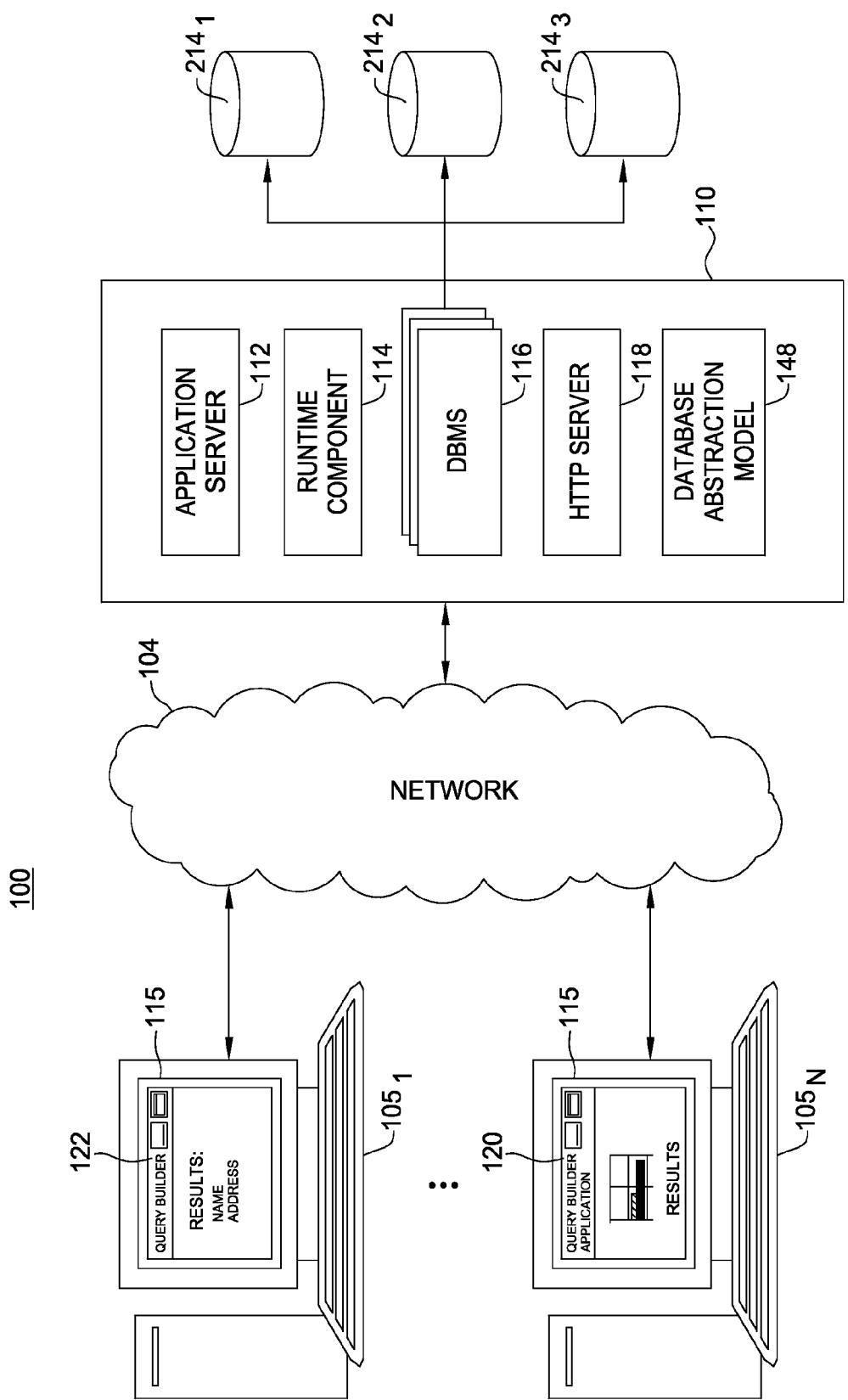
FIG. 1 illustrates a network environment using a client-server configuration, according to one embodiment of the invention.

A database abstraction model is constructed from logical fields that map to data stored in the underlying physical database. Each logical field defines an access method that specifies a location (i.e., a table and column) in the underlying database from which to retrieve data. Users compose an abstract query by selecting logical fields and specifying conditions. Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database.

A database abstraction model may specify user roles, meaning defined categories of users of the database abstraction model. For example, user roles may include job-related categories such as "finance," "research," "IT," and the like. Each user role may be assigned access privileges to particular logical fields. Such user roles may be used, for example, to control access to stored data at a group level rather than at an individual level. The logical fields that are available to a given user role are referred to herein as "permitted fields."

In some situations, abstract queries may be composed by a user (e.g., a database administrator), and may be intended to be executed by other users (e.g., end users) of the database abstraction model. The user roles of the users intended to execute the abstract queries are referred to herein as "delegated roles." However, when composing an abstract query, the administrator may not be aware of which logical fields are permitted for the delegated roles. Thus, the finished abstract query may not be executable by all delegated roles.

Embodiments of the invention provide a database administrator composing an abstract query with visibility to logical fields that are permitted for the delegated roles. In one embodiment, a query interface is configured to receive administrator selections of delegated roles (i.e., the user roles to be provided with access to the finished abstract query). The query interface may then present the administrator with logical fields that are permitted for each delegated role. Providing such information may enable the administrator to verify that all intended users will have access to the finished abstract query.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration. Client computer systems 105$_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query for processing.

As illustrated in FIG. 1, server system 110 may further include a runtime component 114, a database management system (DBMS) 116, and a database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing. In one embodiment, users compose an abstract query from the logical fields defined by the database abstraction model 148. Logical fields and access methods are described in greater detail below in reference to FIGS. 2A-2C.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

Figure 2A:
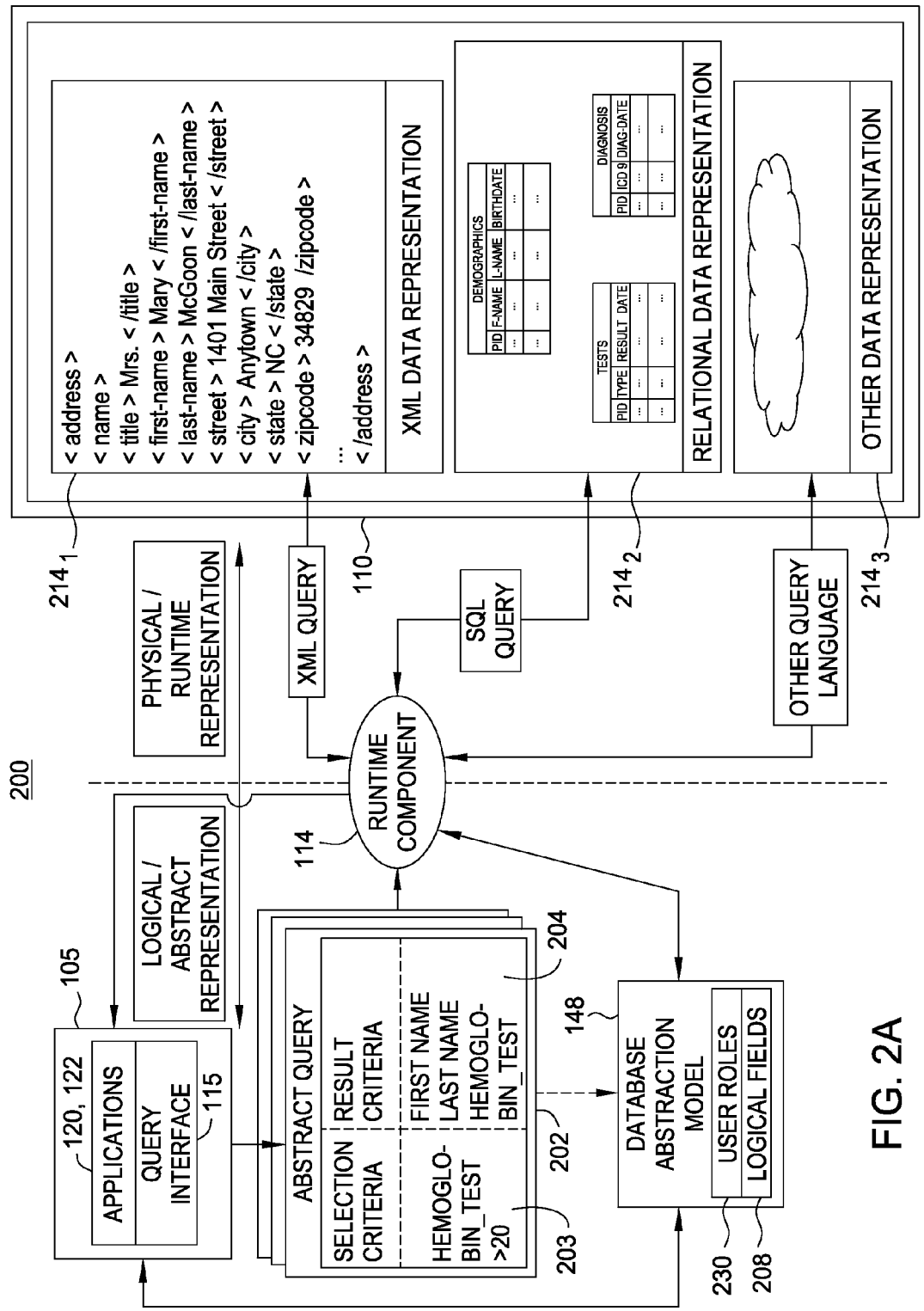
FIGS. 2A-2C illustrate a logical view of a database abstraction model constructed over an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database mechanisms used to store the data (the right side of FIG. 2A).

In one embodiment, users compose an abstract query 202 using the user interface 115. An abstract query 202 is generally referred to as "abstract" because it is composed using logical fields rather than direct references to data structures in the underlying physical databases 214. In one embodiment, the abstract query 202 is composed using logical fields 208 included in the database abstraction model 148. The logical fields 208 include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In one embodiment, the database abstraction model 148 may also define a set of user roles 230, representing metadata describing defined categories of users of the database abstraction model 148. For example, assume a database abstraction model 148 configured for use at a medical research hospital. In this example, various types of users (e.g., developers, technicians, doctors, researchers, accountants, etc.) may require access to different types of information stored in the database abstraction model 148. In one embodiment, each user may be assigned to a particular user role 230 defined as having access to particular logical fields. User roles 230 are described in greater detail below with reference to FIG. 2C.

Figure 2B:
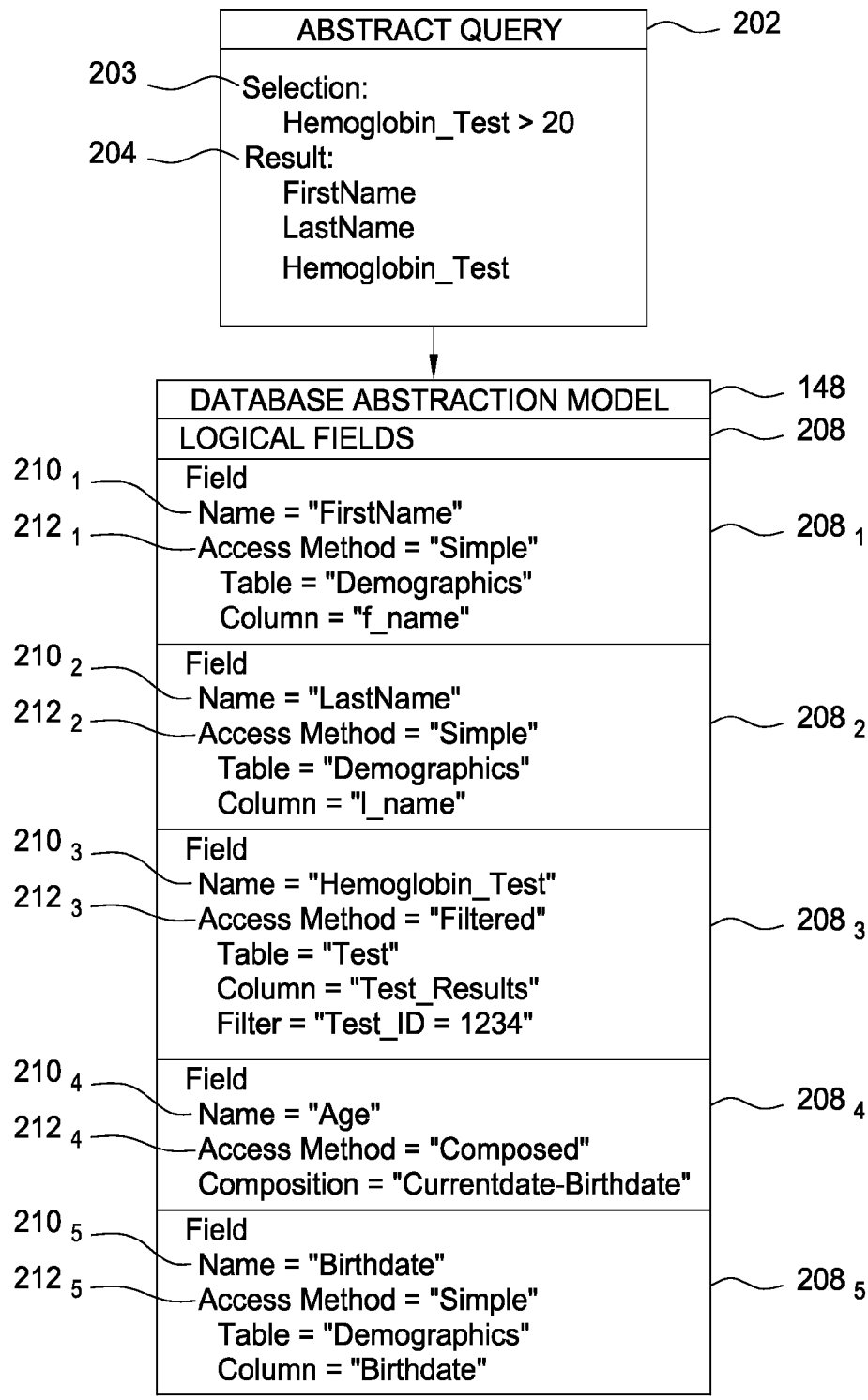

FIG. 2B illustrates an embodiment of the database abstraction model 148 that includes a plurality of logical field specifications $208_{1-5}$ (five shown by way of example). The access methods included in a given logical field specification 208 (or logical field, for short) provide a mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$ and $208_5$ provide simple access methods $212_1$, $212_2$ and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field specification $208_3$ specifies a filtered field $210_3$ named "Hemoglobin_Test." The access method for filtered field $210_3$ maps to data stored in a "Tests" tests table. More specifically, the filtered field $210_3$ is specified in terms of a column storing the test names (i.e., Name Column="Test_ID"), a column storing test values (i.e., Value Column="Test_Results"), and a filter specifying a particular test name (i.e., Filter="1234"). Only data records that satisfy the filter (i.e., records having the value "1234" in the "Test_ID" column) are returned for this logical field. Accordingly, the filtered field $210_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the logical fields, access methods, and additional metadata that, collectively, define the database abstraction model 148 for a particular physical database system. Other storage mechanisms or markup languages, however, are also contemplated.

Figure 2C:
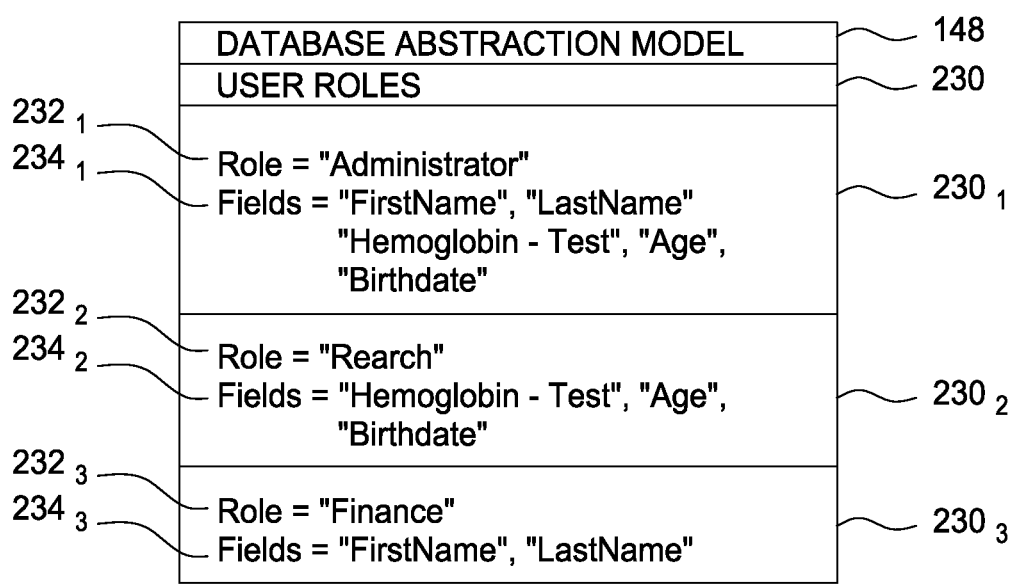

FIG. 2C illustrates an example set of user role definitions 230, according to one embodiment of the invention. A user role definition 230 may specify a user role name 232 and a set of permitted fields 234 (i.e., the logical fields 208 that are available to each user role 230). For example, the user role definition $230_2$ specifies that the user role "Research" $232_2$ has access to the logical fields "Hemoglobin_Test", "Age", and "Birthdate". In another example, the user role definition $230_2$ specifies that the user role "Finance" $232_3$ has access to the logical fields "FirstName" and "LastName". As shown, each user role 230 may be defined as having access to particular permitted fields 234. By assigning each user of the database abstraction model 148 to one or more user roles 230, the users may be provided with access to the logical fields that are relevant to their respective job function, while being blocked from accessing logical fields that are not relevant to their respective job function. In this way, access to sensitive data stored in the database abstraction model 148 may be controlled at a group level (i.e., at a user role level). The assignment of users to user roles 230 may be defined in other data structures of the database abstraction model 148, for example in metadata (not shown) defining authorized users of the database abstraction model 148.

Figure 3:
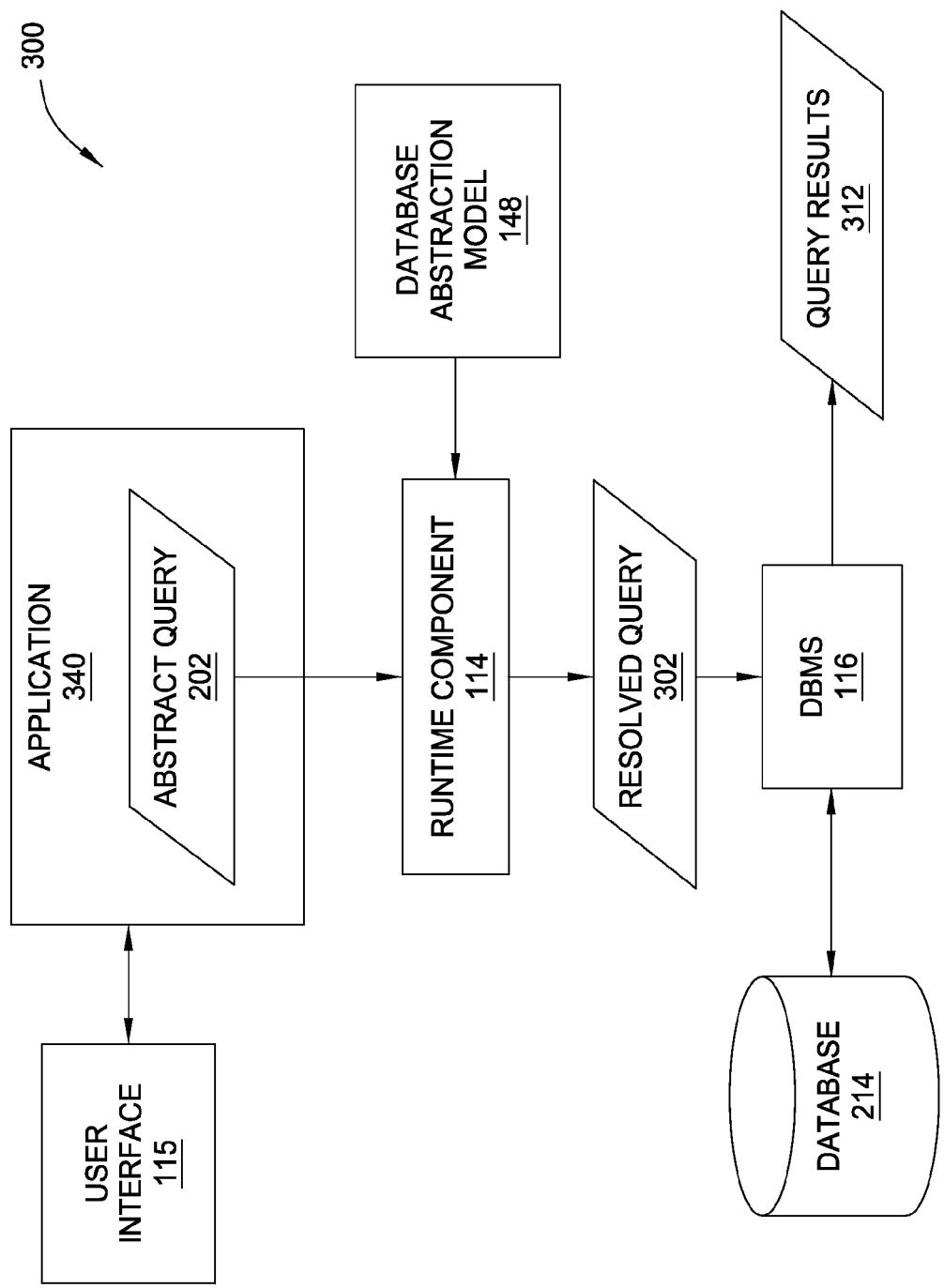
FIG. 3 illustrates a relational view of software components for processing abstract queries for delegated roles, according to one embodiment of the invention.

FIG. 3 illustrates a relational view 300 of software components for executing an abstract query, according to one embodiment of the invention. The software components of relational view 300 include user interface 115, application 310, runtime component 114, database management system (DBMS) 116, database 214, and database abstraction model 148.

As shown, the application 310 includes an abstract query 202. Illustratively, the abstract query 202 is created in the user interface 115, which in this example is a graphical user interface. However, it should be noted that the user interface 115 is only shown by way of example; any suitable requesting entity may create abstract query 202 (e.g., the application 310, an operating system, or an end user). Accordingly, all such implementations are broadly contemplated. As described above, the abstract query 202 may include query conditions for multiple compatible fields.

In one embodiment, the runtime component 114 may evaluate user role definitions 230 specified in the database abstraction model 148 to determine whether the current user has access to the logical fields included in the abstract query 202. If not, the runtime component 114 may return an error (not shown). However, if the user is permitted to access the logical fields included in the abstract query 202, the abstract query 202 is translated by the runtime component 114 into a resolved query 302. This translation is performed with the use of the database abstraction model 148, as described above with reference to FIGS. 2A-2B. The resolved query 302 is submitted to the DBMS 116 for execution against the database 214, thus producing a set of query results 312. The query results 312 may be presented to a user (i.e., in user interface 115), or may be used for further processing (e.g., as inputs for rule processing, etc.).

Figure 4:
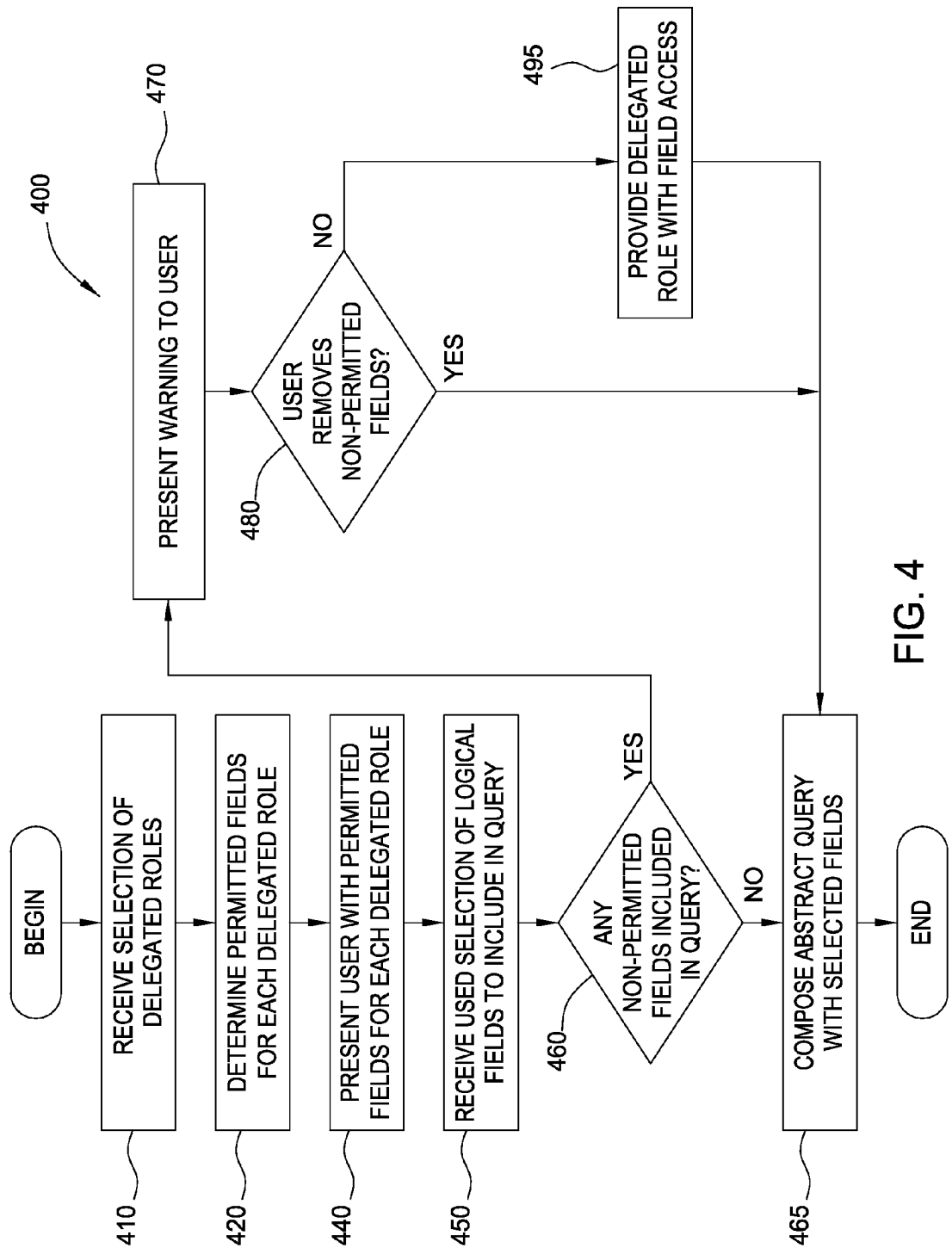
FIG. 4 is a flow diagram illustrating a method for composing an abstract query for delegated roles, according to one embodiment of the invention.

FIG. 4 illustrates a method 400 for composing an abstract query for delegated roles, according to one embodiment of the invention. For the sake of illustration, the method 400 is described in conjunction with systems illustrated in FIGS. 1, 2A-2C, 3, and 6A-6C. Specifically, the steps of method 400 may be assumed to be performed by the runtime component 114 illustrated in FIG. 1. However, persons skilled in the art will understand that any system configured to perform the steps of the method 400, in any order, is within the scope of the present invention.

The method 400 begins at step 410 by receiving selections of delegated roles, meaning user roles to be provided access to the abstract query. In one embodiment, a user may select delegated roles within a graphical user interface as part of composing an abstract query. For example, referring to FIG. 6A, assume the user is a database administrator who is interacting with the query interface 115 to compose an abstract query. The user may be presented with a set of user roles 600, representing predefined roles of users which may need to have access to the abstract query. To select a given user role 600, the administrator may select a corresponding checkbox. For example, to select the user role "RESEARCH" 602, the administrator may select the checkbox 604, which is then displayed as including a checkmark.

In this example, the administrator has selected the user role "FINANCE" 601 and the user role "RESEARCH" 602 as delegated roles, meaning that users assigned to a finance role or a research role will be provided with access to the finished abstract query.

Referring again to FIG. 4, at step 420, logical fields that are permitted for each delegated role may be determined. For example, the runtime component 114 may analyze metadata included in the database abstraction model 148 (e.g., user role definitions 230 shown in FIG. 2C) to determine which logical fields are permitted for each delegated role (e.g., the user role "FINANCE" 601 and the user role "RESEARCH" 602 shown in FIG. 6A).

At step 440, the logical fields permitted for each delegated role may be presented to the administrator. For example, referring to FIG. 6B, the query interface 115 has been updated to include sections corresponding to the delegated roles specified for the query, namely an "ADMINISTRATOR" section 610, a "RESEARCH" section 620, and a "FINANCE" section 630. As shown, each role section may include a set of logical fields 612.

In one embodiment, each logical field 612 is shown with a visual display which indicates whether the associated logical field 612 is permitted for a given delegated role. For example, the checkbox 616 is shown as empty, thus indicating that the logical field "TEST GIVEN" 614 is permitted for the delegated role "ADMINISTRATOR." In another example, the "RESEARCH" section 620 includes permitted logical fields 622 (i.e., fields with empty checkboxes) and non-permitted logical fields 624 (i.e., fields with checkboxes including an "X" symbol). Thus, in this example, a user having a "RESEARCH" user role (e.g., a medical researcher) may be permitted to view test-related data (e.g., test names, test results, age, etc.), but may not be permitted to view personal patient information (e.g., patient address, first name, last name, etc.). In contrast, the "FINANCE" section 630 indicates that a person having a "FINANCE" user role (e.g., a billing specialist) may be permitted to view data required to bill patients for medical services (e.g., tests given to the patient, patient address, first name, last name, etc.), but is not permitted to view data not related to billing (e.g., test results, patient age, etc.).

Figure 6A:
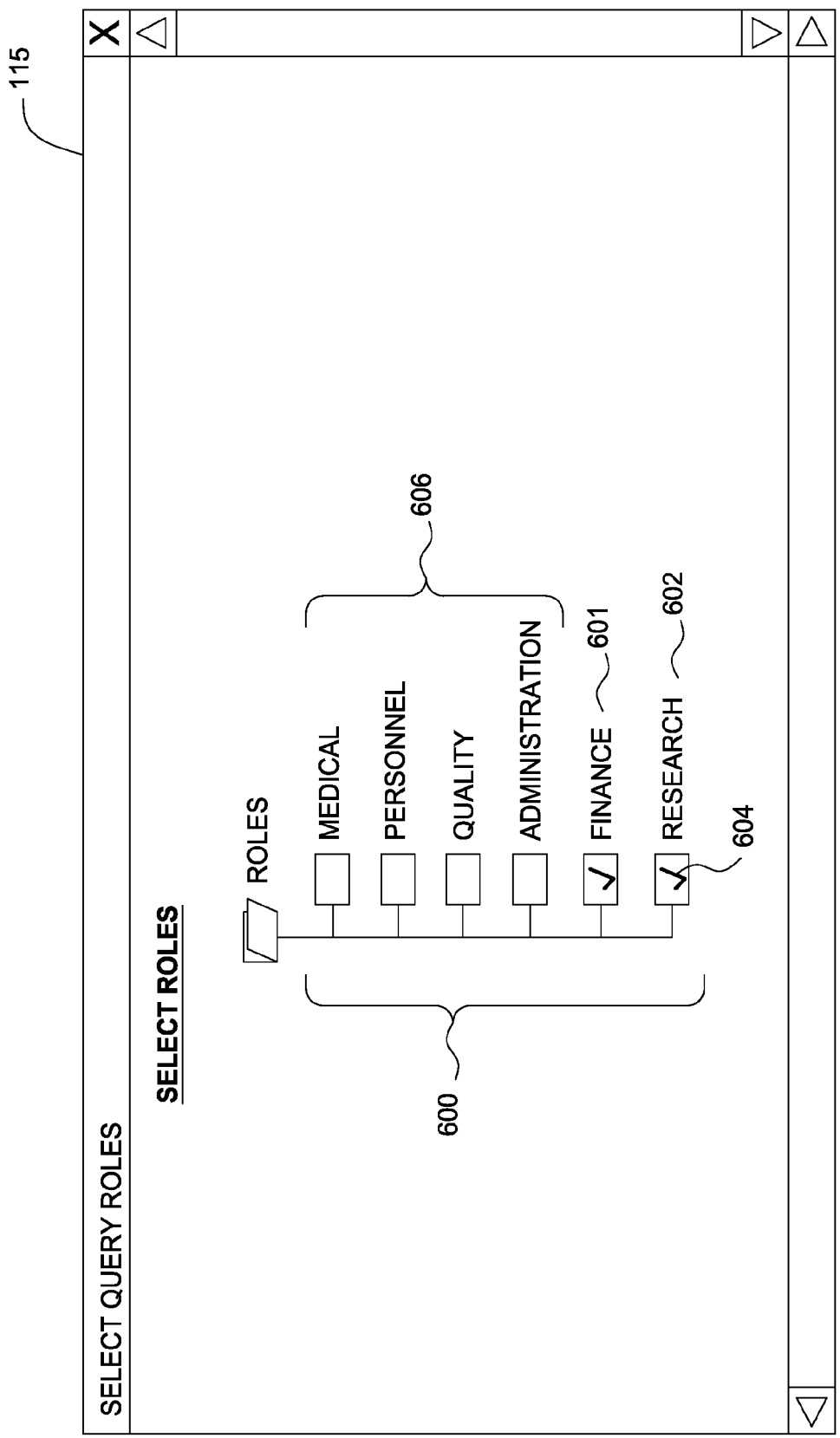
FIGS. 6A-6C illustrate a query interface configured for composing an abstract query for delegated roles, according to one embodiment of the invention.
Figure 6B:
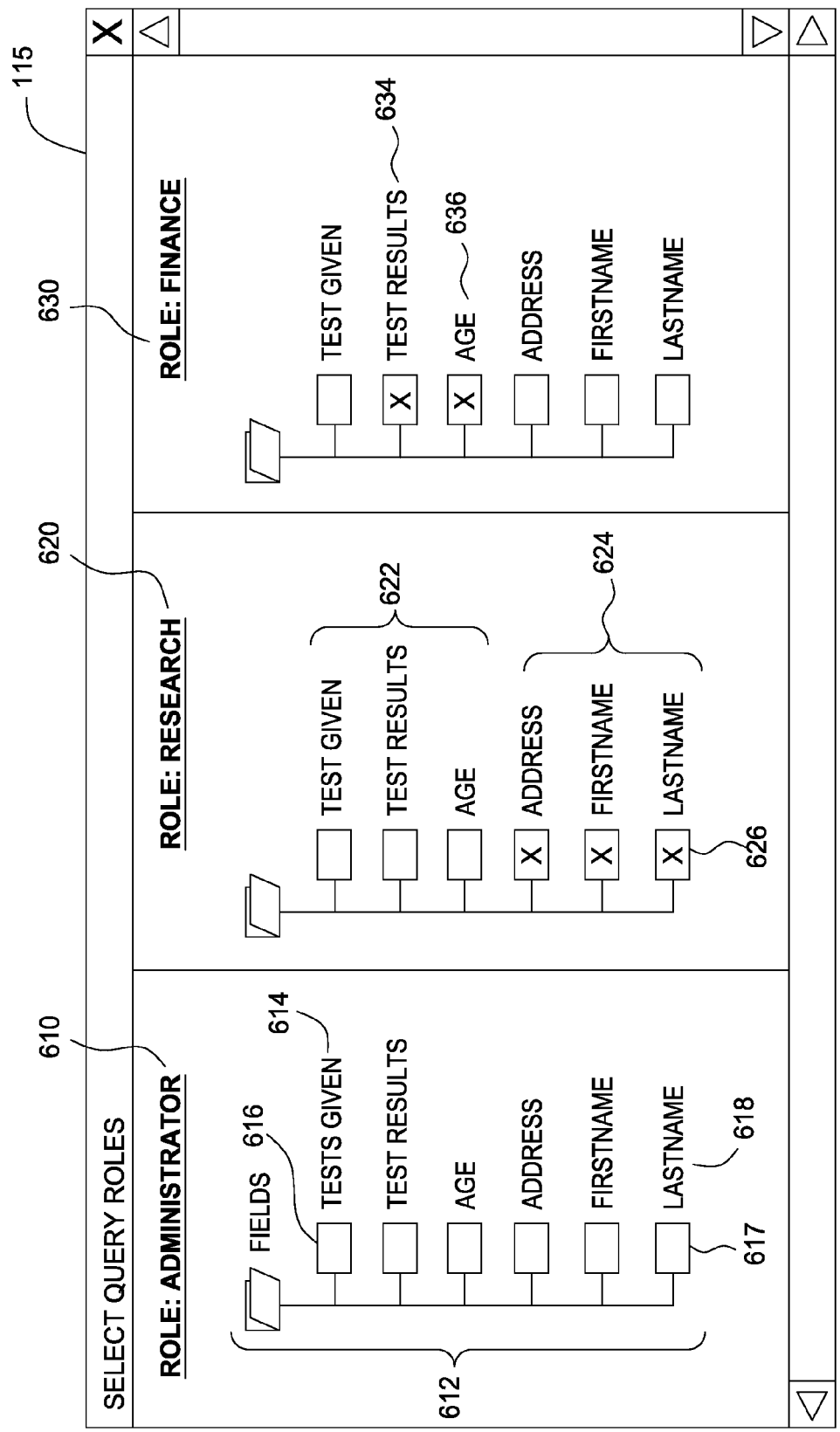
Figure 6C:
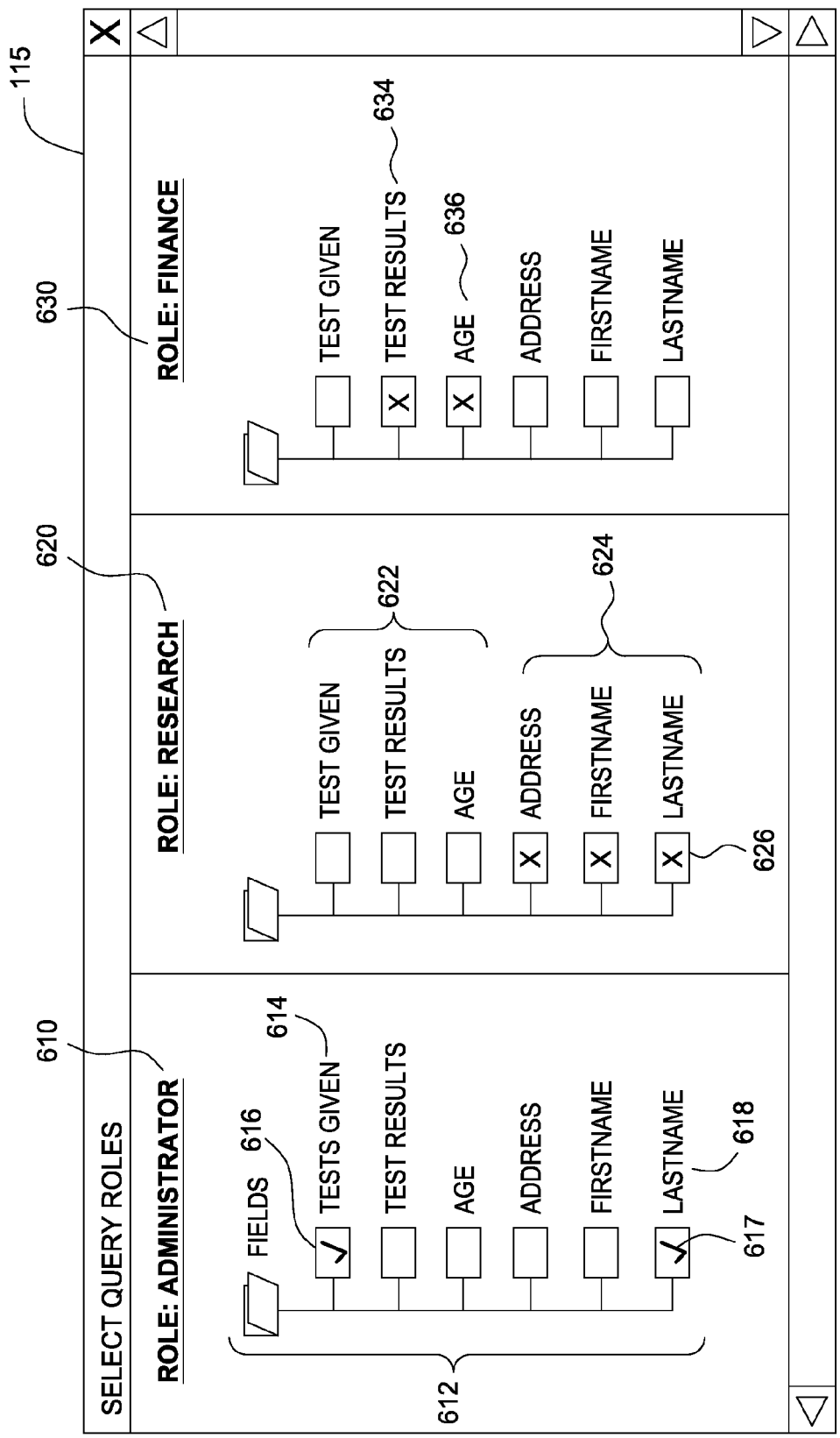

Referring again to FIG. 4, at step 450, logical fields selected by the administrator may be received. In one embodiment, after presenting the permitted logical fields to the administrator (at step 440), the administrator may select specific logical fields to include in an abstract query. For example, the administrator may use the query interface 115 shown in FIG. 6B to select logical fields 612 to include in an abstract query. Assume that the administrator selects the checkbox 616 and the checkbox 617 included in the "ADMINISTRATOR" section 610, thus selecting the logical fields "TESTS GIVEN" 614 and "LAST NAME" 618. As a result, the query interface 115 may be updated to show checkmarks in the checkbox 616 and the checkbox 617 (as shown in FIG. 6C), indicating that the logical fields "TESTS GIVEN" and "LAST NAME" are to be included in an abstract query.

Referring again to FIG. 4, at step 460, it is determined whether any non-permitted fields will be included in the abstract query. For example, the runtime component 114 may determine whether any of the selected logical fields (received at step 450) are not permitted for any of the delegated roles (received at step 410). If not, then the method 400 continues at step 465, where the abstract query may be composed with the logical fields selected by the administrator (received at step 450). After step 465, the method terminates.

However, if any of the selected logical fields are not permitted for any of the delegated roles, then the method 400 continues at step 470, where the administrator is presented with a warning. For example, the administrator may be presented with a pop-up window (not shown) communicating a warning that selected fields are not permitted for all delegated roles. Optionally, the pop-up window may also prompt the administrator to de-select (i.e., remove) any non-permitted fields from the abstract query. At step 480, it may be determined whether the administrator has removed any non-permitted fields. If so, then the method 400 continues at step 465. However, if the administrator has not removed any non-permitted fields at step 490, then the method 400 continues at step 495, where the administrator may optionally modify the access privileges of a given delegated role, such that the selected logical fields will then be permitted for the delegated role. After step 495, the method terminates.

Figure 5:
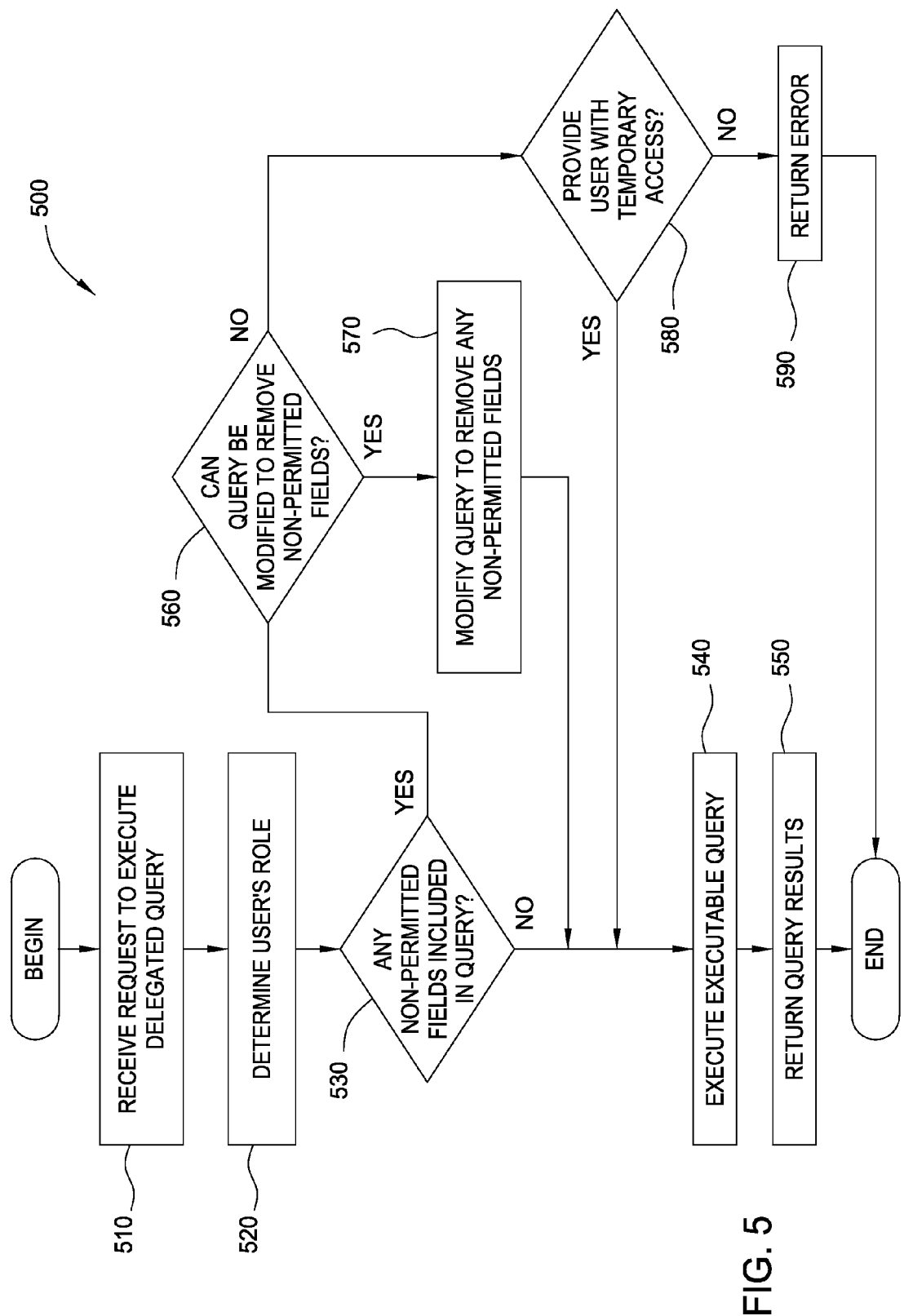
FIG. 5 is a flow diagram illustrating a method for executing an abstract query for delegated roles, according to one embodiment of the invention.

FIG. 5 is a flow diagram illustrating a method 500 for executing an abstract query for delegated roles, according to one embodiment of the invention. For the sake of illustration, the method 500 is described in conjunction with systems illustrated in FIGS. 1, 2A-2C, 3, and 6A-6C. Specifically, the steps of method 500 may be assumed to be performed by the runtime component 114 illustrated in FIG. 1. However, persons skilled in the art will understand that any system configured to perform the steps of the method 500, in any order, is within the scope of the present invention.

The method 500 begins at step 510, by receiving a request to execute an abstract query. For example, a requesting user may select an abstract query from a menu of queries provided by a query interface 115. At step 520, the user role of the requesting user may be determined. For example, the runtime component 114 (illustrated in FIG. 1) may analyze stored data describing users (e.g., database tables, metadata, etc.) to determine the user role (e.g., research, finance, etc.) of the requesting user.

At step 530, it is determined whether any non-permitted fields are included in the requested abstract query. For example, the runtime component 114 may determine whether any of the logical fields included in the requested abstract query are not permitted for the user role determined at step 520. If not, then the method 500 continues at step 540, where the abstract query may be executed. At step 550, the results of executing the abstract query are returned. For example, the query results may be displayed in query interface 115. The query results may be generated when the runtime component 114 retrieves data from the physical database 214 by generating a resolved query (e.g., an SQL statement) from the abstract query. After step 550, the method 500 terminates.

However, if it is determined at step 530 that any non-permitted fields are included in the requested abstract query, then the method 500 continues at step 560, where it is determined whether the abstract query can be modified to remove the non-permitted fields. In one embodiment, the runtime component 114 may determine that the abstract query can be modified if the non-permitted fields are specified as output fields (i.e., are returned in query results) that can be removed without materially affecting other output fields included in the query results. For example, referring to the example shown in FIG. 6C, assume that the abstract query is composed to include the logical fields "TESTS GIVEN" 614 and "LAST NAME" 618 as output fields. Assume also that this abstract query is executed by a person having the "RESEARCH" user role. Since the logical field "LAST NAME" 618 is not permitted for this user role, the runtime component 114 may determine whether the abstract query can be modified to remove this non-permitted field. For example, such a modification may not be performed if the non-permitted field is the only output field, if the query output is grouped and/or sorted according to the non-permitted field, and the like. Assuming that the runtime component 114 determines that the logical field "LAST NAME" 618 can be removed, the abstract query may then be modified to specify the logical field "TESTS GIVEN" 614 as the only output field. Of course, it is also contemplated that non-permitted fields may be removed from the abstract query under other circumstances. For example, non-permitted fields may be removed from query conditions in the case that doing so does not without materially affect the query results (i.e., if the modified query returns the same results as the original query), in the case that the results of the modified query are determined to be useful despite being different from the results of the original query, and the like.

If it is determined at step 560 that the abstract query can be modified to remove the non-permitted fields, then the method 500 continues at step 570, where the abstract query is modified by removing the non-permitted fields (as described above). The method 500 then continues at step 540 (described above). However, if it is determined at step 560 that the abstract query cannot be modified to remove the non-permitted fields, then the method 500 continues at step 580, where it is determined whether the requesting user may be provided with temporary access to the non-permitted fields. If so, then the method 500 continues at step 540 (described above). If not, the method 500 continues at step 590, where an error message may be returned. For example, an error message may be returned to the requesting user of query interface 115 (e.g., pop-up window, audio alert, etc.). After step 590, the method 500 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method of abstract query composition based on user roles defined in a database abstraction model, the computer-implemented method comprising:
   providing the database abstraction model, which contains a plurality of logical field definitions defining a plurality of logical fields that map to a plurality of physical fields of one or more underlying physical databases, each of the plurality of logical field definitions specifying: (i) a logical field name and (ii) an access method comprising a function of one or more of the plurality of physical fields; wherein the database abstraction model further defines a set of user roles; the plurality of logical field definitions specifying at least two types of access methods selected from: (i) a simple access method mapping to a specified physical field; (ii) a filtered access method applying a specified filter to a physical field; and (iii) a composed access method mapping to a set of values generated from one or more physical fields based on a specified formula;
   prior to selecting any logical field to include in an abstract query desired to be composed, selecting, from the set of user roles, a plurality of user roles desired to have permission to execute the abstract query once composed, wherein the plurality of user roles is selected based on input from an administrative user of the database abstraction model;
   subsequent to selecting the plurality of user roles, determining, by operation of one or more computer processors, a group of permitted logical fields to which access is permitted for at least one of the selected plurality of user roles;
   generating output conveying: (i) the group of permitted logical fields as being permitted based on the selected plurality of user roles and (ii) a group of non-permitted logical fields as being non-permitted based on the selected plurality of user roles;
   subsequent to generating the output, selecting, from the group of permitted logical fields and based on input from the administrative user responsive to the generated output, one or more logical fields to include in the abstract query desired to be composed;
   composing the abstract query based on the selected one or more logical fields; and
   responsive to receiving, from a non-administrative user, a request to execute the composed abstract query, and upon determining that the non-administrative user has a role that matches at least one of the selected plurality of user roles defined in the database abstraction model, executing the composed abstract query in order to generate a set of query results, whereafter the set of query results is output for the non-administrative user.

2. The computer-implemented method of claim 1, further comprising:
   upon determining that the non-administrative user does not have any of the selected plurality of user roles defined in the database abstraction model, returning an error indication to communicate that the non-administrative user is not permitted to execute the composed abstract query.

3. The computer-implemented method of claim 1, further comprising:
   upon determining that the non-administrative user does not have any of the selected plurality of user roles defined in the database abstraction model, modifying the composed abstract query to remove at least one logical field in order to render the composed abstract query executable for the non-administrative user.

4. The computer-implemented method of claim 1, wherein the set of query results is output to the non-administrative user via the query interface.

5. The computer-implemented method of claim 1, further comprising, prior to composing the abstract query:
   upon determining that a first of the one or more logical fields to include in the abstract query is not included in all of the groups of permitted logical fields determined for the plurality of user roles, returning a warning message to convey to the administrative user that the first logical field that is not permitted for at least one user role.

6. The computer-implemented method of claim 1, wherein the output is conveyed to the administrative user, wherein the computer-implemented method further comprises:
   prior to generating the output, determining the group of non-permitted logical fields, to which access by the selected plurality of user roles is not permitted;
   wherein the composed abstract query is executed for the non-administrative user in a first instance, in which instance the set of query results is output for the non-administrative user via the query interface, wherein the computer-implemented method further comprises, in a second instance:

upon determining that the non-administrative user does not have any of the selected plurality of user roles defined in the database abstraction model, returning an error indication to convey to the non-administrative user that the non-administrative user is not permitted to execute the composed abstract query;

wherein the generated output conveys, to the administrative user, permitted fields in terms of one or more logical fields in the database abstraction model and not in terms of any physical field in the physical database.

7. The computer-implemented method of claim 6, wherein the generated output conveys, to the administrative user, non-permitted fields in terms of one or more logical fields in the database abstraction model and not in terms of any physical field in the physical database, wherein at least a first of the plurality of logical fields maps to at least a first of the plurality of physical fields, the first physical field having a physical field name different from the logical field name of the first logical field;

wherein the group of permitted logical fields is presented in a query interface, at least a portion of the group of permitted logical fields being designated with the indication of which of the plurality of user roles the respective logical field is accessible by, in order to facilitate verification of appropriate access permissions from user roles to groups of logical fields, including avoiding both improperly granted permissions and improperly denied permissions;

wherein at least one user role of the set of user roles is not selected, wherein the user role comprises a first user role.

8. The computer-implemented method of claim 7, wherein the group of logical fields includes a first subset of permitted logical fields to which access by the first user role is permitted but to which access by a second user role is denied, wherein the group of logical fields further includes a second subset of logical fields to which access by the second user role is granted but to which access by the first user role is denied;

wherein the group of permitted logical fields to which access is permitted for the at least one of the selected plurality of user roles is determined based on a set of user role definitions stored in the database abstraction model, each user role definition pertaining to a respective user role;

wherein the respective user role definition for each user role specifies: (i) a user role name for the respective user role and (ii) a set of permitted fields for the respective user role;

wherein the set of permitted fields for each user role is specified in terms of one or more logical fields in the database abstraction model and not in terms any physical field in the physical database.

9. The computer-implemented method of claim 8, wherein the composed access method maps a respective logical field to a set of values dynamically generated from at least two physical fields based on the specified formula, wherein the computer-implemented method further comprises, in a third instance:

upon determining that the non-administrative user does not have any of the selected plurality of user roles defined in the database abstraction model, modifying the composed abstract query to remove at least one logical field in order to render the composed abstract query executable for the non-administrative user.

10. The computer-implemented method of claim 9, wherein determining a group of permitted logical fields to which access is permitted comprises analyzing stored properties characterizing the set of user roles, wherein the computer-implemented method further comprises:

prior to receiving the selection of a plurality of user roles, displaying the set of user roles in the query interface.

11. The computer-implemented method of claim 10, further comprising:

prior to composing the abstract query, and upon determining that a first of the one or more logical fields to include in the abstract query is not included in the group of permitted logical fields, returning a warning message to convey to the non-administrative user that the first logical field is not permitted for at least one user role.

12. A computer-readable storage medium containing a program which, when executed, performs an operation of abstract query composition based on user roles defined in a database abstraction model, the operation comprising:

providing the database abstraction model, which contains a plurality of logical field definitions defining a plurality of logical fields that map to a plurality of physical fields of one or more underlying physical databases, each of the plurality of logical field definitions specifying: (i) a logical field name and (ii) an access method comprising a function of one or more of the plurality of physical fields; wherein the database abstraction model further defines a set of user roles; wherein the plurality of logical field definitions specifies at least two access methods selected from: (i) a simple access method mapping to a specified physical field; (ii) a filtered access method applying a specified filter to a physical field; and (iii) a composed access method mapping to a set of values generated from one or more physical fields based on a specified formula;

prior to selecting any logical field to include in an abstract query desired to be composed, selecting, from the set of user roles, a plurality of user roles desired to have permission to execute the abstract query once composed, wherein the plurality of user roles is selected based on input from an administrative user of the database abstraction model;

subsequent to selecting the plurality of user roles, determining, by operation of one or more computer processors when executing the program, a group of permitted logical fields to which access is permitted for at least one of the selected plurality of user roles;

generating output conveying: (i) the group of permitted logical fields as being permitted based on the selected plurality of user roles and (ii) a group of non-permitted logical fields as being non-permitted based on the selected plurality of user roles;

subsequent to generating the output, selecting, from the group of permitted logical fields and based on input from the administrative user responsive to the generated output, one or more logical fields to include in the abstract query desired to be composed;

composing the abstract query based on the selected one or more logical fields; and responsive to receiving, from a non-administrative user, a request to execute the composed abstract query, and upon determining that the non-administrative user has a role that matches at least one of the plurality of user roles defined in the database abstraction model, executing the composed abstract query in order to generate a set of query results, whereafter the set of query results is output for the non-administrative user.

13. The computer-readable storage medium of claim 12, wherein the operation further comprises:
   upon determining that the non-administrative user does not have any of the selected plurality of user roles defined in the database abstraction model, returning an error indication to communicate that the non-administrative user is not permitted to execute the composed abstract query.

14. The computer-readable storage medium of claim 12, wherein the operation further comprises:
   upon determining that the non-administrative user does not have any of the selected plurality of user roles defined in the database abstraction model, modifying the composed abstract query to remove at least one logical field in order to render the composed abstract query executable for the non-administrative user.

15. The computer-readable storage medium of claim 12, wherein the set of query results is output to the non-administrative user via the query interface.

16. The computer-readable storage medium of claim 12, wherein the operation further comprises, prior to composing the abstract query:
   upon determining that a first of the one or more logical fields to include in the abstract query is not included in all of the groups of permitted logical fields determined for the plurality of user roles, returning a warning message to convey to the administrative user that the first logical field is not permitted for at least one user role.

17. A system of abstract query composition based on user roles defined in a database abstraction model, the system comprising:
   one or more computer processors; and
   a memory containing a program which, when executed by the one or more computer processors, performs an operation comprising:
      providing the database abstraction model, which contains a plurality of logical field definitions defining a plurality of logical fields that map to a plurality of physical fields of one or more underlying physical databases, each of the plurality of logical field definitions specifying: (i) a logical field name and (ii) an access method comprising a function of one or more of the plurality of physical fields; wherein the database abstraction model further defines a set of user roles; wherein the plurality of logical field definitions specifies at least two access methods selected from: (i) a simple access method mapping to a specified physical field; (ii) a filtered access method applying a specified filter to a physical field; and (iii) a composed access method mapping to a set of values generated from one or more physical fields based on a specified formula;
      prior to selecting any logical field to include in an abstract query desired to be composed, selecting, from the set of user roles, a plurality of user roles desired to have permission to execute the abstract query once composed, wherein the plurality of user roles is selected based on input from an administrative user of the database abstraction model;
      subsequent to selecting the plurality of user roles, determining a group of permitted logical fields to which access is permitted for at least one of the selected plurality of user roles;
      generating output conveying: (i) the group of permitted logical fields as being permitted based on the selected plurality of user roles and (ii) a group of non-permitted logical fields as being non-permitted based on the selected plurality of user roles;
      subsequent to generating the output, selecting, from the group of permitted logical fields and based on input from the administrative user responsive to the generated output, one or more logical fields to include in the abstract query desired to be composed;
      composing the abstract query based on the selected one or more logical fields; and
      responsive to receiving, from a non-administrative user, a request to execute the composed abstract query, and upon determining that the non-administrative user has a role that matches at least one of the plurality of user roles defined in the database abstraction model, executing the composed abstract query in order to generate a set of query results, whereafter the set of query results is output for the non-administrative user.

18. The system of claim 17, wherein the operation further comprises:
   upon determining that the non-administrative user does not have any of the selected plurality of user roles defined in the database abstraction model, returning an error indication to communicate that the non-administrative user is not permitted to execute the composed abstract query.

19. The system of claim 17, wherein the operation further comprises:
   upon determining that the non-administrative user does not have any of the selected plurality of user roles defined in the database abstraction model, modifying the composed abstract query to remove at least one logical field in order to render the composed abstract query executable for the non-administrative user.

20. The system of claim 17, wherein the set of query results is output to the non-administrative user via the query interface.

21. The system of claim 17, wherein the operation further comprises, prior to composing the abstract query:
   upon determining that a first of the one or more logical fields to include in the abstract query is not included in all of the groups of permitted logical fields determined for the plurality of user roles, returning a warning message to convey to the administrative user that the first logical field is not permitted for at least one user role.

* * * * *